(12) United States Patent
Goldbrunner et al.

(10) Patent No.: US 10,443,589 B2
(45) Date of Patent: Oct. 15, 2019

(54) DEVICE FOR DOSING A FILL PRODUCT INTO A CONTAINER TO BE FILLED

(71) Applicant: KRONES AG, Neutraubling (DE)

(72) Inventors: Christian Goldbrunner, Hallertau (DE); Florian Engelsberger, Regensburg (DE); Manfred Faltermeier, Elsendorf (DE); Stefan Koller, Bad Abbach (DE); Thomas Schuhbeck, Hemau (DE)

(73) Assignee: KRONES AG, Neutraubling (DE)

( * ) Notice: Subject to any disclaimer, the term of this patent is extended or adjusted under 35 U.S.C. 154(b) by 525 days.

(21) Appl. No.: 14/483,077

(22) Filed: Sep. 10, 2014

(65) Prior Publication Data

US 2015/0071802 A1    Mar. 12, 2015

(30) Foreign Application Priority Data

Sep. 11, 2013 (DE) .................. 10 2013 109 969

(51) Int. Cl.
*F04B 23/06* (2006.01)
*F04B 23/02* (2006.01)
(Continued)

(52) U.S. Cl.
CPC .............. *F04B 23/06* (2013.01); *B65B 3/12* (2013.01); *B67C 3/206* (2013.01); *F04B 9/042* (2013.01);
(Continued)

(58) Field of Classification Search
CPC ....... B65B 3/32; B65B 39/145; F04B 7/0057; F04B 7/0069; F04B 7/04; F04B 9/042; F04B 13/00; F04B 15/02; F04B 19/22; F04B 23/025; F04B 23/06; F04B 15/023; F04B 49/22; F04B 53/1087; B67D 7/64; B67D 7/70
(Continued)

(56) References Cited

U.S. PATENT DOCUMENTS 1,073,067 A * 9/1913 Ayars .................... F04B 7/0053
141/146
1,359,367 A * 11/1920 Hansen .................. B65B 43/60
141/146
(Continued)

FOREIGN PATENT DOCUMENTS

DE    2321206 C1    5/1974
EP    0775635 A1    5/1997
(Continued)

OTHER PUBLICATIONS

Extended European Search Report dated Feb. 11, 2015 from corresponding European Application No. 14184367.2.

*Primary Examiner* — Alexander B Comley
(74) *Attorney, Agent, or Firm* — Haynes and Boone, LLP

(57) ABSTRACT

A device for dosing a fill product into a container is described. The device includes a dosing unit with a dosing cylinder, a dosing piston displaceably disposed in the dosing cylinder between an upper center and a lower center of the dosing cylinder, and an intake valve with a valve seat for sucking the fill product from a rotatable product reservoir. The valve seat is disposed above a level formed by a base of the dosing piston at the lower center.

14 Claims, 3 Drawing Sheets

(51) Int. Cl.
| | |
|---|---|
| *F04B 15/02* | (2006.01) |
| *F04B 9/04* | (2006.01) |
| *F04B 13/00* | (2006.01) |
| *B65B 3/12* | (2006.01) |
| *B67C 3/20* | (2006.01) |
| *F04B 19/22* | (2006.01) |
| *G01F 11/02* | (2006.01) |
| *B65B 3/32* | (2006.01) |

(52) U.S. Cl.
CPC .............. *F04B 13/00* (2013.01); *F04B 15/02* (2013.01); *F04B 23/02* (2013.01); *B65B 3/323* (2013.01); *F04B 19/22* (2013.01); *G01F 11/024* (2013.01); *G01F 11/029* (2013.01)

(58) Field of Classification Search
USPC ................. 222/372, 380, 309, 373, 377; 141/144–147, 142
See application file for complete search history.

(56) References Cited

U.S. PATENT DOCUMENTS

| | | | | | |
|---|---|---|---|---|---|
| 1,468,254 | A | * | 9/1923 | Ayars | B65B 3/323 141/142 |
| 2,141,618 | A | * | 12/1938 | Roge | B65B 39/145 141/128 |
| 2,243,451 | A | * | 5/1941 | Bauer | B65B 3/323 141/146 |
| 2,563,863 | A | * | 8/1951 | Nordquist | B65B 3/323 137/627.5 |
| 2,578,732 | A | * | 12/1951 | Nordquist | B65B 3/323 141/146 |
| 2,770,404 | A | * | 11/1956 | Galloway | B65B 3/305 141/141 |
| 2,896,676 | A | * | 7/1959 | Minard | B65B 3/323 141/146 |
| 3,040,787 | A | * | 6/1962 | Knoll | B65B 39/145 141/143 |
| 3,073,359 | A | * | 1/1963 | Albrecht | B65B 3/323 141/142 |
| 3,096,914 | A | * | 7/1963 | Kerr | B65B 39/001 137/859 |
| 3,097,672 | A | * | 7/1963 | Minard | B65B 39/145 141/142 |
| 3,168,225 | A | * | 2/1965 | Miller | B65B 39/004 141/142 |
| 3,175,738 | A | * | 3/1965 | Wyers | A47L 15/4418 222/309 |
| 3,349,973 | A | * | 10/1967 | Smith | B65B 3/323 222/168.5 |
| 3,358,719 | A | * | 12/1967 | Minard | B65B 3/26 141/146 |
| 3,459,340 | A | * | 8/1969 | Smith | B65B 3/323 222/380 |
| 3,580,302 | A | * | 5/1971 | Riesenberg | B67C 3/206 141/141 |
| 3,760,853 | A | * | 9/1973 | Trusselle | B65B 3/12 141/146 |
| 3,830,264 | A | * | 8/1974 | Billett | B65B 3/323 141/1 |
| 3,833,155 | A | * | 9/1974 | Farfaglia | B65B 3/32 141/147 |
| 3,841,363 | A | * | 10/1974 | Stigler | B65B 3/323 141/142 |
| 3,850,345 | A | * | 11/1974 | Merritt | B65B 3/323 222/168.5 |
| 3,967,662 | A | * | 7/1976 | Warner | B65B 43/60 141/148 |
| 3,971,494 | A | * | 7/1976 | Rosen | B65B 3/32 222/450 |
| 4,055,281 | A | * | 10/1977 | Rosen | B65B 3/32 222/309 |
| 4,065,032 | A | * | 12/1977 | Lydiksen | B65B 3/32 141/191 |
| 4,178,929 | A | * | 12/1979 | Voegele | G01F 11/021 222/129 |
| 4,230,160 | A | * | 10/1980 | Buckley | B65B 39/001 137/901 |
| 4,244,404 | A | * | 1/1981 | Brockner | B67C 3/206 141/146 |
| 4,318,431 | A | * | 3/1982 | Evans | B65B 55/24 141/114 |
| 4,410,108 | A | * | 10/1983 | Minard | B65B 39/001 141/261 |
| 4,501,622 | A | * | 2/1985 | Marchadour | B08B 3/02 134/18 |
| 4,566,612 | A | * | 1/1986 | von Kreuter | A23G 9/28 137/846 |
| 4,602,964 | A | * | 7/1986 | Marchadour | B08B 3/02 134/18 |
| 4,708,269 | A | * | 11/1987 | Willerding | B65B 3/323 134/169 R |
| 4,798,235 | A | * | 1/1989 | Torterotot | B65B 3/32 141/258 |
| 5,019,127 | A | * | 5/1991 | Bohm | B65B 3/32 141/258 |
| 5,108,014 | A | * | 4/1992 | Nordmeyer | B65B 39/004 222/148 |
| 5,230,373 | A | * | 7/1993 | Engler | B65B 3/12 141/146 |
| 5,356,041 | A | * | 10/1994 | Hellenberg | B01F 13/1058 141/103 |
| 5,400,927 | A | * | 3/1995 | Marchadour | B65B 3/32 222/309 |
| 5,417,260 | A | * | 5/1995 | Perrier | B67C 3/206 141/140 |
| 5,769,136 | A | * | 6/1998 | Kanematsu | B65B 3/32 141/129 |

FOREIGN PATENT DOCUMENTS

| | | | |
|---|---|---|---|
| EP | 0999176 A1 | | 5/2000 |
| EP | 1647519 A1 | | 4/2006 |
| FR | 2851764 | * | 9/2004 |
| JP | H10-316 101 A | | 12/1998 |

* cited by examiner

DEVICE FOR DOSING A FILL PRODUCT INTO A CONTAINER TO BE FILLED

CROSS REFERENCE TO RELATED APPLICATIONS

This application claims priority from German Patent Application No. 10 2013 109 969.6, filed on Sep. 11, 2013 in the German Patent and Trademark Office, the disclosure of which is incorporated herein by reference in its entirety.

BACKGROUND

Technical Field

The present invention relates to a device for dosing a fill product into a container to be filled, preferably for dosing a viscous and/or paste-like fill product such as, for example, cream, yogurt, jam, ketchup, mayonnaise and/or baby food.

Related Art

Devices using a rotary-type process for dosing fill products into containers to be filled are known. A plurality of dosing units are generally provided around the periphery of a product reservoir, each of the dosing units having a dosing cylinder within which a dosing piston is displaceably disposed.

In the dosing units, the fill product held in the product reservoir is sucked into the dosing cylinder by means of the dosing piston. The volume sucked in is then expelled from a fill product outlet into the container below that is to be filled. Dosing of a precise volume is thereby achieved by means of the positively guided movement within the dosing cylinder of the dosing piston, which alternately sucks fill product from the product reservoir and then pushes it via a product outlet aperture into the container to be filled.

Appropriate switching between the paths that convey the product—i.e., a product channel between the dosing cylinder and the product reservoir, and an ejection channel between the dosing cylinder and the ejection aperture—is achieved in each case by means of valves. For this purpose, horizontal rotary slides, vertical rotary valves, check valves or seat valves are for example used.

FR 2 851 764 A1 discloses a device with a product reservoir upon which are mounted dosing units. The dosing units include a dosing cylinder disposed on the periphery of the product reservoir, within which a cam-controlled dosing piston is guided and which has two pneumatically controlled valves. The first valve, which is configured as an intake valve, is positioned between the dosing cylinder and the outlet valve, and switches the product channel from the product reservoir into the dosing cylinder. The intake valve is embodied as a seat valve, and can be opened and closed in a radial direction. The outlet valve is disposed below the intake valve in the axial direction of the dosing cylinder, and substantially includes a double-acting pneumatic cylinder, through which the fill product is conveyed when it is ejected.

Known arrangements, in which a radially actuated seat valve connects the product reservoir with the dosing cylinder, cannot achieve adequate ventilation of the underside of the dosing piston, with the result that a high degree of accuracy in filling cannot be achieved due to the compressible air cushion that is present in the dosing cylinder. Furthermore, emptying the product reservoir at the end of the filling procedure presents a problem.

SUMMARY

A device for dosing a fill product that enables greater accuracy of filling is provided.

A device for dosing a fill product into a container to be filled is proposed, that includes a dosing unit with a dosing cylinder within which a dosing piston is displaceably disposed between an upper center and a lower center, and an intake valve with a valve seat for sucking the fill product from a rotatable product reservoir. According to one embodiment, the valve seat in operation is disposed at a level above the level formed by the base of the dosing piston at its lower center.

Because the valve seat in operation is disposed at a level above the level formed by the base of the dosing piston at its lower center, any air cushion that may be present below the base of the dosing piston can flow back into the product reservoir via the intake valve above. As a result, an air cushion below the base of the dosing piston is reduced or can be fully eliminated, which makes it possible to achieve reliable filling of the container that is to be filled, with the intended volume of fill product.

Furthermore, when production begins, the dosing cylinder with the dosing piston can be ventilated at the lower end of the dosing cylinder, and gas or air that accumulates during production can be conducted away, so that no cushion of air or cushion of another gas forms below the base of the dosing piston, or else such a cushion forms only to a very slight extent. By reducing or preventing a cushion of air or gas of undefined extent in the dosing cylinder, the accuracy of filling of the device can be further improved.

The device in some embodiments further includes a rotatable product reservoir, on the periphery of which the dosing unit can be disposed. The intake valve, and in particular the valve seat of the intake valve, is in one embodiment disposed on the underside of the product reservoir. In this manner, it is possible for the fill product in the product reservoir to flow out of the product reservoir in full, without a large portion of ambient air being sucked in. In contrast to the radially disposed intake valves that are known from the state of the art, in which, when the fill level of the product reservoir is no longer sufficient, air is sucked into at least the upper area of the intake valve, the substantially horizontal disposal of the valve seat ensures a full intake of fill product even when the intake valve is barely covered by fill product, and at the same time prevents the sucking in of air.

Thus, by means of the proposed arrangement in which the product reservoir is connected on its underside with the intake valve, and in certain embodiments, the valve seat is correspondingly disposed horizontally on the underside of the product reservoir, it is possible to achieve accurate dosing of the fill product until the product reservoir is almost completely empty. Less fill product therefore needs to be discarded at the end of the dosing cycle. Furthermore, it is possible to improve the accuracy with which the required volumes are dosed, since less air is sucked in.

In other embodiments, the intake valve and the dosing cylinder are in fluid communication with each other via a product channel, wherein the product channel in its installed state generally runs with an upward inclination to the intake valve. The product channel is thereby also disposed at an inclination with respect to a direction of stroke of the dosing piston.

The inclined run of the product channel makes it possible to eject a gas cushion that has accumulated below the base of the dosing piston. This can be ejected via the product channel and the intake valve into the product reservoir. Consequently, no cushion of gas or air accumulates in the product channel, with the result that the accuracy of dosing can again be increased. The lower center of the dosing piston in the dosing cylinder is thereby typically disposed such that the level of the base of the dosing piston is no higher than the level of the upper edge of the product channel, or below this. This allows air or gas below the base of the dosing piston to flow out via the product channel and the intake valve into the product reservoir.

The dosing piston in the dosing cylinder, the intake valve, and an outlet valve are in one embodiment controlled and/or operated mechanically by means of a cam or positive control, or by pneumatic, electropneumatic, electromagnetic and/or electromotive means.

In an exemplary embodiment, at least the intake valve and the outlet valve are both pneumatically controlled, wherein suitable switches for the pneumatic control unit are operated by means of switching cams, which, during the rotation of the dosing cylinder, are actuated mechanically on the fixed frame of the device as they pass actuating means which are fixed or can be activated or switched. This allows, firstly, a particularly simple construction, which avoids a complex control system. Secondly, for example in the event that a container to be filled is missing or a dosing unit is defective, it is possible to suspend in a simple mechanical manner the actuation of the applicable valves by means of the cams.

An intake valve in the form of a seat valve and/or an outlet valve, for example in the form of a seat valve or a double-acting pneumatic cylinder, are in various embodiments operated along an axis that is parallel to the stroke axis of the dosing piston in the dosing cylinder. This arrangement makes it possible for the product stream to flow substantially axially through the intake valve along the valve tappet, then be sucked into the dosing cylinder, and then flow, again substantially axially, along the moveable parts of the outlet valve.

The moveable parts of each valve can be sealed against the environment, and/or against the fill product, by means of bellows. This results in a general flow around the bellows, with fibrous components of the dosed product less easily becoming trapped between the folds of the bellows. The resulting flow around the bellows also leads to reduced stress on the bellows due to alternating load conditions, in comparison with a flow transversely across the bellows such as would occur with a radial arrangement of the intake valve. The mechanical wear of components can thereby be reduced.

The dosing unit, including the intake valve, the dosing cylinder with the dosing piston, and the outlet valve together with the outlet channel, is in several embodiments constructed in a modular fashion, such that the dosing unit can be mounted on the product reservoir as a ready-to-function unit, and can subsequently be removed therefrom. Due to the modular design, if a defect should occur, the entire dosing unit can simply be replaced as a module.

The product reservoir in certain embodiments has a base plate to which the dosing unit is fixedly attached such that the valve seat is usually flush with the inner side of the base plate. In the base plate, at least one pressurizing medium channel is particularly generally provided, for applying a pressurizing medium to at least one valve actuator of the intake valve and/or the outlet valve. To serve as the pressurizing medium channel, a compressed air channel can, for example, be incorporated in the base plate of the product reservoir, and supply compressed air to the applicable valve actuators of the dosing unit. The compressed air channel does not need to be switched. It can instead supply a constant flow of compressed air. In the same manner, an air outlet channel can also be provided, by means of which the used compressed air can be discharged without entering the filling area.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
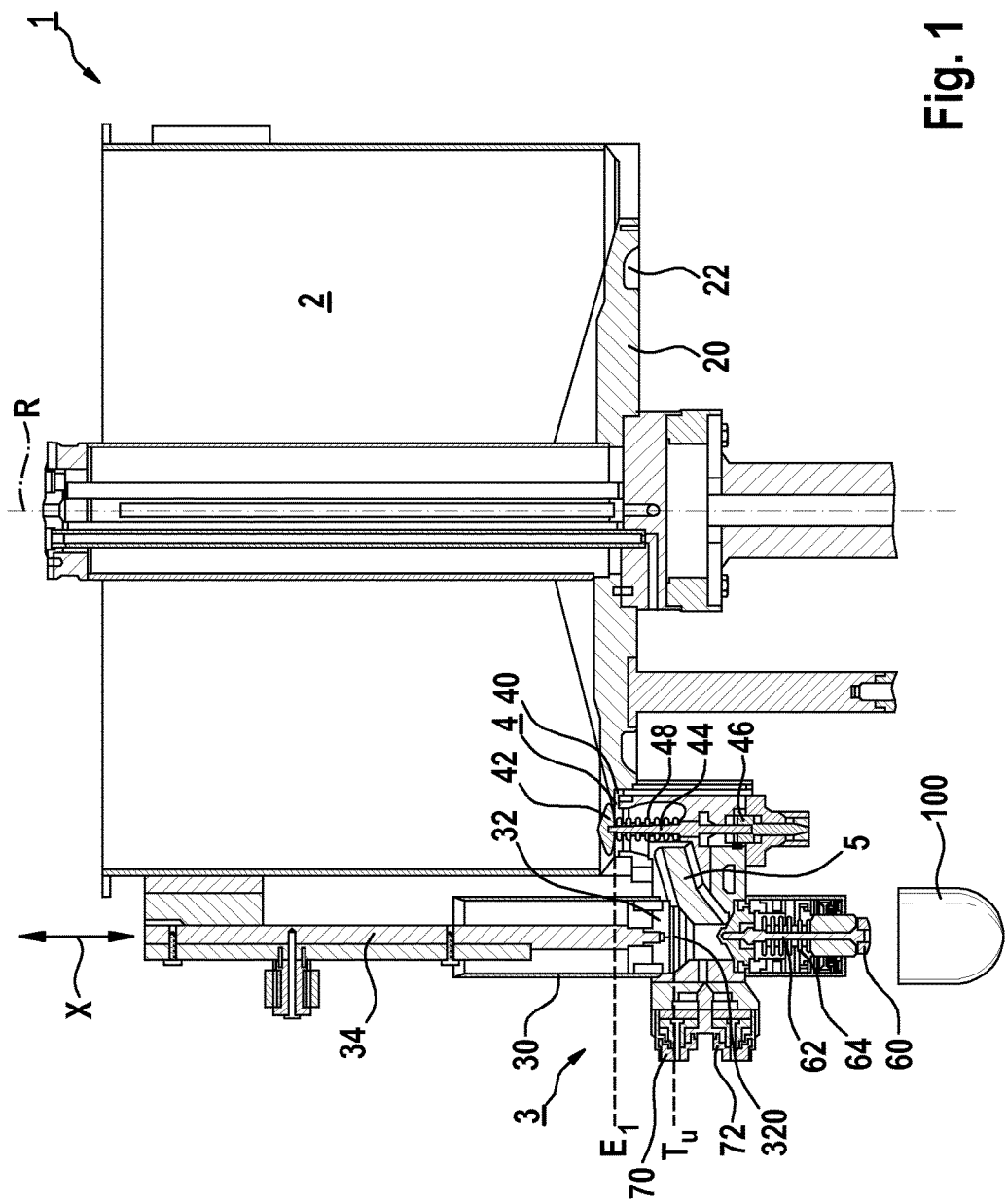
FIG. 1 is a schematic sectional representation of a first embodiment of a device for dosing a fill product.

FIG. 1 shows a device 1 for dosing a fill product into a schematically shown container 100 that is to be filled. The device 1 serves in particular to dose viscous and/or paste-like fill products into the container 100, in order to introduce a predetermined volume of the fill product into the container 100 within a specified time.

The fill product to be dosed is held in a product reservoir 2, and dosed into the container 100 by means of a dosing unit 3.

The dosing unit 3 has a dosing cylinder 30, in which is displaceably disposed a dosing piston 32 which can be moved upwards and downwards in the dosing cylinder 30 by means of a linkage 34 between an upper center and a lower center $T_u$. The upward and downward movement of the dosing piston 32 in the dosing cylinder 30 thereby creates a cavity that is variable in size below the base 320 of the dosing piston 32. When the dosing piston 32 is raised, a partial vacuum is created by the cavity, and by means of this the fill product is sucked from the product reservoir 2. When the dosing piston 32 moves downwards, the fill product is ejected into the container 100 that is to be filled.

The supply of fill product from the product reservoir 2 is achieved by means of an intake valve 4, which is directly connected to the base plate 20 of the product reservoir 2. The intake valve 4 has a valve seat 40, which is disposed substantially horizontally in operation. The valve disk 42 for sealing or opening the intake valve 4 sits on the valve seat 40. In the example embodiment shown in FIG. 1, the horizontally disposed valve seat 40 is substantially flush with the base plate 20 of the product reservoir 2. Accordingly, fill product that is held in the product reservoir 2 can pass via the intake valve 4 through the valve seat 40 and via a product channel 5 to reach the underside of the dosing piston 32, by means of which it is sucked into the dosing cylinder 30.

In order to dose a fill product accommodated in the product reservoir 2, the intake valve 4 is first opened. (In the example embodiment shown, this is carried out by lifting the valve disk 42 out of the valve seat 40.) The dosing piston 32 is then raised in the dosing cylinder 30, causing the fill product in the product reservoir 2 to be sucked through the intake valve 4 and the product channel 5 into the dosing cylinder 30.

At the upper center of the dosing piston 32, the intake valve 4 is again closed by lowering the valve disk 42 into the valve seat 40. When the dosing piston 32 is subsequently lowered, the volume of fill product in the dosing cylinder 30 is ejected via the fill product outlet 60 into the container 100. An outlet valve 62 is provided in the form of a double-acting pneumatic cylinder, by means of which the fill product outlet 60 can be opened and closed. When the fill product is being sucked out of the product reservoir 2 and the intake valve 4 is open, the outlet valve 62 is closed, so that the suction created by the rising dosing piston 32 can act to full effect on the fill product in the product reservoir 2.

When the fill product accommodated in the dosing cylinder 30 is being ejected by lowering the dosing piston 32, the intake valve 4 is closed and the outlet valve 62 is open, in order to direct the stream of fill product exclusively through the fill product outlet 60.

The intake valve 4 and in particular the valve seat 40 are disposed at a level $E_1$, which, when the dosing unit 3 is in its installed state, lies above the level defined by the base 320 of the dosing piston 32 at its lower center $T_U$. Consequently, an air cushion or gas cushion that has formed below the base 320 of the dosing piston 32 can be pushed, at least at the lower center $T_U$ of the dosing piston 32, via the product channel 5 and the intake valve 4 back into the product reservoir 2. The air or gas thus flows away from this lower center $T_U$ of the base 320 of the dosing piston 32 and via the product channel 5 and the intake valve 4 into the product reservoir 2.

The product channel 5 is in various embodiments inclined upwards towards the intake valve 4, in order also to prevent an air cushion or gas bubbles from accumulating in the product channel 5. Instead, these will also be ejected through the intake valve 4 back into the product reservoir 2.

In this manner it is also possible, at the start of production, to carry out the full ventilation of the dosing cylinder 30, such that no gas or air remains below the base 320 of the dosing piston 32. During production, it is further possible to eject at the lower center $T_U$ via the intake valve 4 any accumulations of gas or air that would form an air cushion below the dosing piston 32.

In this manner, the dosing accuracy of the dosing unit 3 is increased, since the dosing volume thereby consists to a high degree, or even completely, of the fill product, and inaccuracies due to the presence of an undefined volume of air or gas (which is furthermore compressible) are avoided.

The valve disk 42 of the intake valve 4 is raised and lowered by means of a valve rod 44, which is itself actuated by means of a pneumatic valve actuator 46. The moveable parts of the intake valve 4 are sealed against the fill product and/or the environment by means of a bellows 48.

As is immediately clear from FIG. 1, a product stream flows around the bellows 48 of the intake valve 4 such that the product stream impinges on the bellows 48 in an axial direction. The flow around and/or over the bellows 48 is therefore in a longitudinal direction. The bellows 48 is in several embodiments composed of polytetrafluoroethylene (PTFE), or else it is designed as a metallic bellows. The orientation of the bellows 48 such that the flow around the bellows 48 is in a longitudinal direction enables lower-wear operation, since it avoids the substantially transverse flow around the bellows that is known from the state of the art, in which the intake valve is arranged radially. Accordingly the bellows 48 in the example embodiment shown is subject to significantly reduced transverse mechanical loads. Furthermore, it is more difficult for, for example, fibrous components of the fill product to become trapped between the folds of the bellows, since they are flushed out during the outflow of the product, and are also more easily captured during cleaning. The flow around the bellows 48 that is shown thus leads to reduced stress due to alternating load conditions in comparison with the substantially perpendicular incident flow according to the state of the art. The use of suitable materials for the bellows 48, for example the use of PTFE, reduces the thermal and/or chemical components of the wear parameters.

The arrangement of the valve seat 40 in a horizontal position and in some embodiments, substantially flush with the base plate 20 of the product reservoir 2 further enables the loss of product at the cessation of production to be reduced compared to the conventional radial arrangement of the intake valve. In particular, the intake of fill product can continue for as long as the intake valve 4 is still covered by fill product. Premature sucking in of air, such as was known with the radial intake valves in their upper valve area, does not occur with the intake valve 4 due to its horizontal orientation. Residues in the product reservoir 2 can accordingly also be substantially emptied via the dosing units 3.

Removal of residues can, for example, be carried out if a collection device, into which the product residues from the product reservoir 2 are pumped, is disposed specifically for this purpose below the product outlet 60.

In the example embodiment shown, both the actuator 46 of the intake valve 4 and the actuator of the outlet valve 62 are pneumatically controlled. The compressed air required for this is conveyed to the dosing unit 3 via a pressurizing medium channel 22 incorporated in the base plate 20 of the product reservoir 2, with the connection provided by means of suitable drilled holes in the body which forms the dosing unit 3. It is thereby possible to dispense with elaborate tubing or ducting, since the insertion of the dosing unit 3 in itself typically results in the connection of the applicable connecting holes with the pressurizing medium channel 22.

The intake valve 4 and the outlet valve 62 are switched by means of mechanical switching cams 70, 72, which are actuated by control elements (not shown in FIG. 1) that are fixedly attached to, or can be pneumatically activated on, the non-rotating part of the device 1. Thus at certain rotational positions or at certain working angles of the device 1 as it rotates, the applicable switching cam 70, 72 is actuated such that either the intake valve 4 is opened or closed, or the outlet valve 62 is opened or closed. The mechanically controlled switching cams 70, 72 enable a simpler mechanical construction, which dispenses with elaborate control of the intake valve 4 and/or the outlet valve 62 in the rotating part of the device 1.

When control elements are used which can be activated pneumatically to engage with the switching cams 70, 72, it is possible additionally to achieve the exclusion of specific dosing units 3, which can then, for example, be activated or deactivated selectively. Furthermore, by this means one or more dosing units can be selectively opened to empty residues from the product reservoir 2 at a specific position.

In the base plate 20 of the product reservoir 2, not only a pressurizing medium channel 22 but also an air outlet channel is generally provided, by means of which the used compressed air from the valve actuators of the intake valve 4 and the outlet valve 62 can be intercepted before it reaches the areas where it would come into contact with the product.

In the example embodiment shown, the valve rod 44, which lowers or raises the valve disk 42 of the intake valve 4 in the valve seat 40, is oriented parallel to the direction of stroke X of the dosing piston 32. The direction in which the outlet valve 62 is opened and closed is also arranged in the direction of stroke X. The direction of stroke X is also parallel to the axis of rotation R of the product reservoir 2 during the production process.

The fact that the valve rod 44, and the direction in which the intake valve 4 is opened and closed, are oriented parallel to the direction of stroke X of the dosing piston 32 also makes it possible in a simple manner to achieve the removal of residues from the product reservoir 2, as well as the reliable ejection of gas residue below the base 320 of the dosing piston 32. This is in particular the case if the valve seat 40 is above the lower center of the base 320 of the dosing piston 32.

The dosing unit 3 in an exemplary embodiment has a fully modular construction, such that the dosing unit 3 can be attached to the base plate 20 of the product reservoir 2 as a ready-to-function unit, and forms a self-contained functional unit. In order to replace it, for example in the event of a defect, the entire dosing unit 3 can be removed and replaced by another. By this means, maintenance and/or repair times can be reduced.

The outlet valve 62 can be designed as a diaphragm valve, as a pinch valve, or as a seat valve.

The valves can be controlled by electropneumatic, pneumatic, electromagnetic or electromotive means, using for example servomotors, pneumatic actuators or stepper motors.

The outlet valve 62 can be designed, for example, in the form of a pneumatic cylinder, wherein the stroke of the outlet valve 62 is variable by mechanical means, for example stroke limiters that can be inserted and replaced manually, or by pneumatic means, for example a double-stage cylinder.

Figure 2:
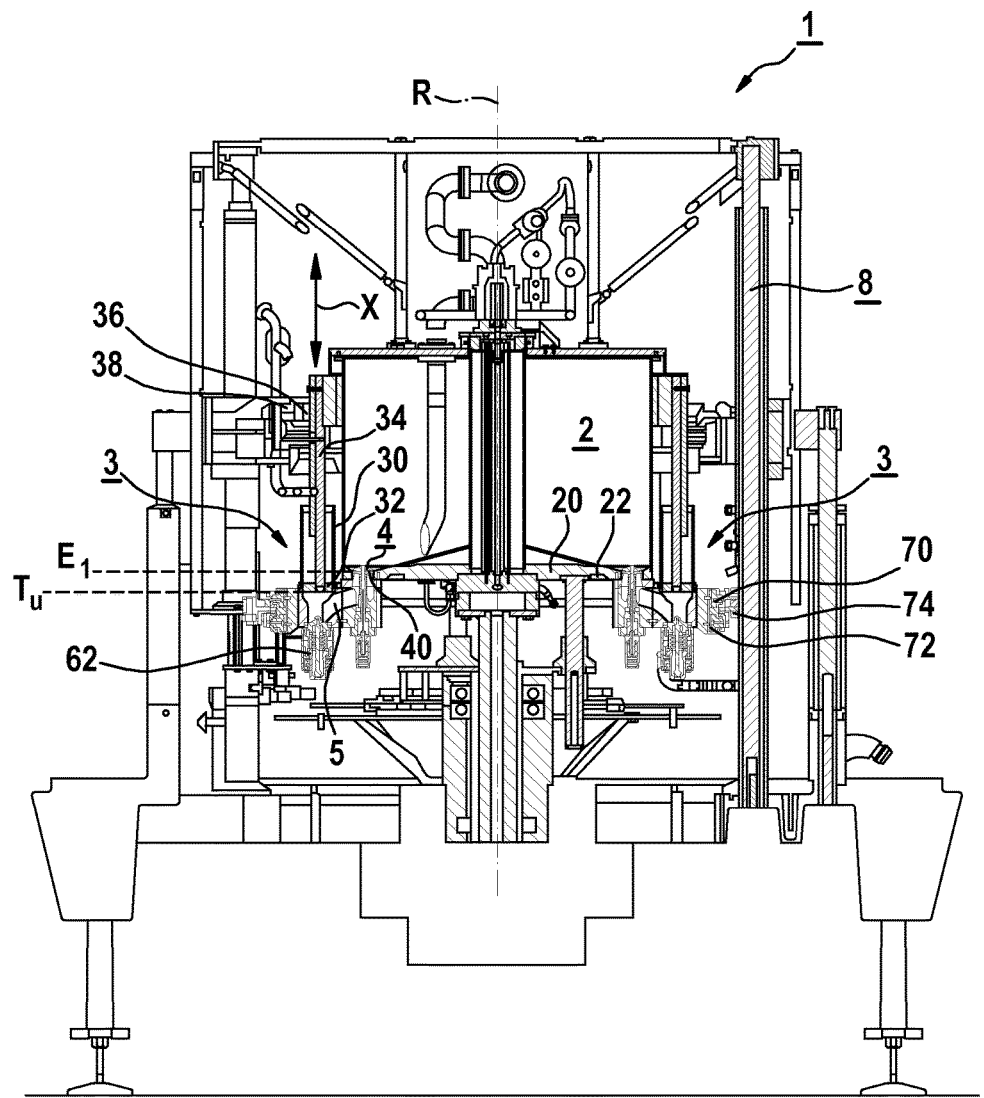
FIG. 2 illustrates a second embodiment of a device for dosing a fill product.

FIG. 2 shows a further device 1, which again has a product reservoir 2, a dosing unit 3 with a dosing cylinder 30, and a dosing piston 32. An intake valve 4 is also provided, whose valve seat 40 is again disposed at a level $E_1$, which lies above the lower center $T_U$ of the dosing piston 32. The intake valve 4 is connected with the dosing cylinder 30 via a product channel 5 which is inclined upwards. An outlet valve 62 is also provided.

The design shown in FIG. 2 corresponds substantially to the design that is also known from FIG. 1.

In FIG. 2 it can also be seen that a plurality of dosing units 3 are provided, which are disposed on the periphery of the product reservoir 2.

The linkage 34, which is connected with the dosing piston 32, is controlled by means of a positive guide in the form of a cam control system with a cam roller 36, which runs in a corresponding control curve 38. The control curve 38 is retained on the stationary frame 8 of the device 1.

In the example embodiment shown, the switching cams 70, 72 are controlled at the applicable angular positions by mechanical switching means 74, which are disposed on the stationary frame 8.

Figure 3:
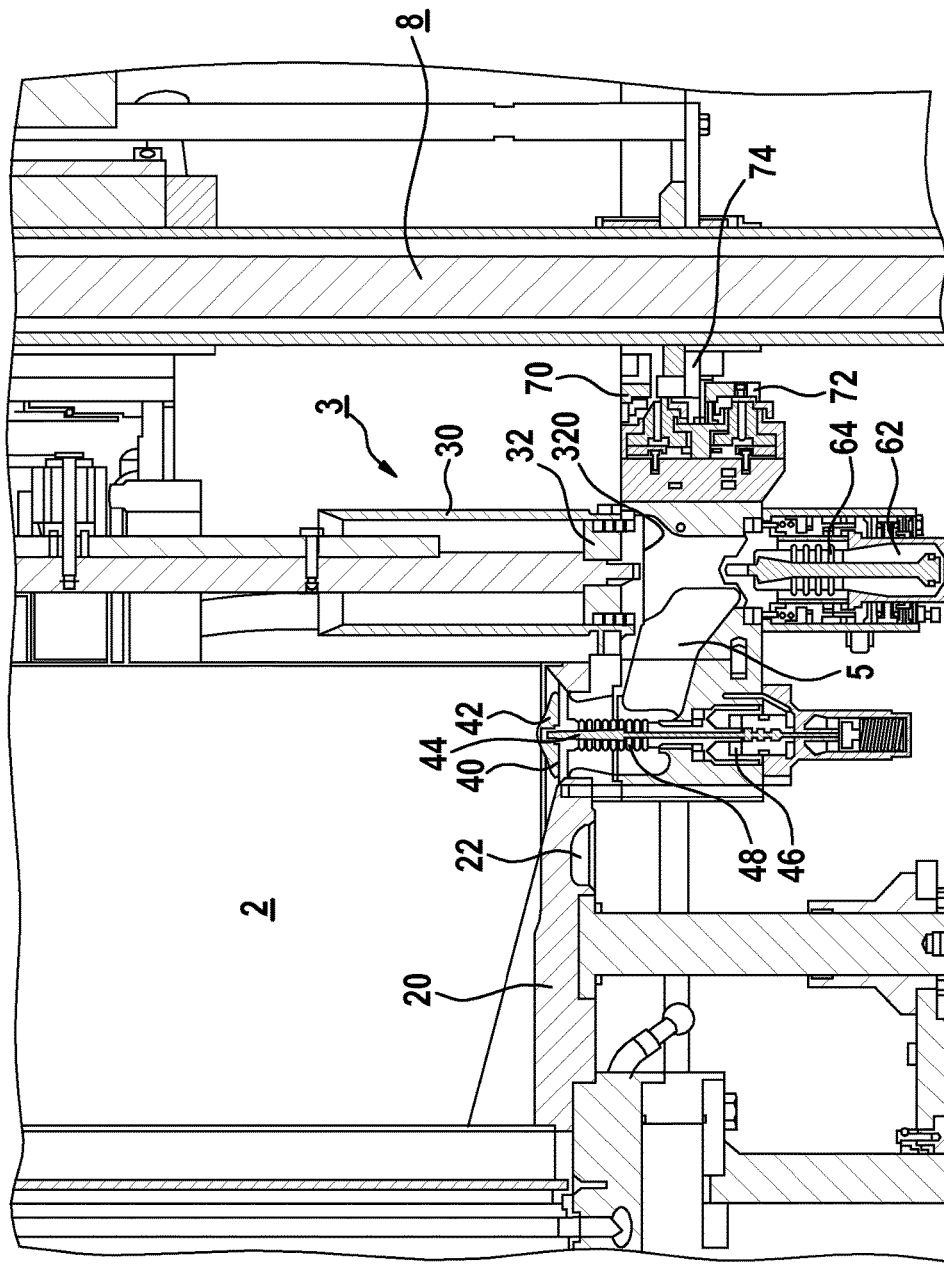
FIG. 3 is a representation of a detail of a dosing unit mounted on the product reservoir according to FIG. 2.

FIG. 3 shows a schematic enlargement of a detail of a dosing unit 3 with a connection to the product reservoir 2 according to FIG. 2.

The valve seat 40 is disposed substantially flush with the base plate 20 of the product reservoir 2, so that almost all residues of fill product can be removed from the product reservoir 2. It can be seen particularly clearly here that the product channel 5 is inclined and the base 320 of the dosing piston 32 is disposed at a level below that of the valve seat 40.

It can further be recognized that the design of the bellows 48, 64 of the intake valve 4 and the outlet valve 62 is such that the flow around these is in a longitudinal direction.

To the extent applicable, all individual features described in the individual embodiments can be combined with each other and/or exchanged, without departing from the field of the invention.

The invention claimed is:

1. A device for dosing a fill product into a container comprising:
   a dosing unit with a dosing cylinder;
   a dosing piston displaceably disposed in the dosing cylinder between an upper center and a lower center of the dosing cylinder;
   an intake valve with a valve seat and a valve disk sitting on the valve seat configured to suck the fill product from a rotatable product reservoir, wherein the valve seat is disposed above a level formed by a base of the dosing piston at the lower center and the intake valve is configured to be opened by lifting the valve disk out of the valve seat into the rotatable product reservoir, wherein the rotatable product reservoir is configured to provide the fill product to the intake valve;
   a product channel that connects the intake valve and the dosing cylinder, wherein a longitudinal axis of the product channel is inclined in relation to a longitudinal axis of the dosing piston; and
   an outlet valve configured to eject the fill product from the dosing cylinder, wherein the outlet valve is in fluid connection with the dosing cylinder, the intake valve and the outlet valve are switchable using mechanical switching cams, and the mechanical switching cams are pneumatically controlled.

2. The device of claim 1, wherein the valve seat is disposed substantially horizontally.

3. The device of claim 2, wherein the valve seat is connected horizontally to the rotatable product reservoir.

4. The device of claim 1, wherein the intake valve and the dosing cylinder are in fluid communication with each other via the product channel.

5. The device of claim 4, wherein the product channel extends with an upward inclination to the intake valve.

6. The device of claim 1, further comprising a bellows to seal moveable parts of the intake valve against the fill product.

7. The device of claim 1, wherein the dosing unit is disposed on an underside of the rotatable product reservoir.

8. The device of claim 1, wherein the valve seat is mounted on a base plate of the rotatable product reservoir.

9. The device of claim 1, wherein the dosing unit has a modular construction and is configured to be connected to the rotatable product reservoir as a ready-to-function unit.

10. The device of claim 1, wherein the mechanical switching cams are switchable using switching means that are fixed or activatable, the switching means disposed on a stationary part of the device, as the switching cams make passing contact.

11. The device of claim 1, wherein the rotatable product reservoir comprises a base plate, and the dosing unit is fixedly attached to the base plate such that the intake valve is substantially flush with an inner side of the base plate.

12. The device of claim 11, wherein the valve seat of the intake valve is substantially flush with the inner side of the base plate.

13. The device of claim 1, wherein a direction of operation of the intake valve is along an axis that is parallel to a stroke axis of the dosing piston and parallel to an axis of rotation of the rotatable product reservoir.

14. A device for dosing a fill product into a container comprising: a dosing unit with a dosing cylinder; a dosing piston displaceably disposed in the dosing cylinder between an upper center and a lower center of the dosing cylinder; an intake valve with a valve seat and a valve disk sitting on the valve seat configured to suck the fill product from a rotatable product reservoir configured to provide the fill product to the intake valve, wherein the valve seat is disposed above a level formed by a base of the dosing piston at the lower center, the intake valve is configured to be opened by lifting the valve disk out of the valve seat into the rotatable product reservoir, and the valve seat is disposed horizontally on a side of the rotatable product reservoir; a product channel that connects the intake valve and the dosing cylinder, wherein a longitudinal axis of the product channel is inclined in relation to a longitudinal axis of the dosing piston; and an outlet valve configured to eject the fill product from the dosing cylinder, wherein the outlet valve is in fluid connection with the dosing cylinder, the intake valve and the outlet valve are switchable using mechanical switching cams, and the mechanical switching cams are pneumatically controlled.

\* \* \* \* \*